United States Patent
Phadke

(10) Patent No.: US 9,218,341 B2
(45) Date of Patent: Dec. 22, 2015

(54) METHOD AND SYSTEM FOR LANGUAGE TRANSLATION

(71) Applicant: Lingua Next Technologies Pvt. Ltd., Pune (IN)

(72) Inventor: Rajeevlochan Phadke, Pune (IN)

(73) Assignee: Lingua Next Technologies Pvt. Ltd., Maharashtra (IN)

( * ) Notice: Subject to any disclaimer, the term of this patent is extended or adjusted under 35 U.S.C. 154(b) by 192 days.

(21) Appl. No.: 13/975,425

(22) Filed: Aug. 26, 2013

(65) Prior Publication Data

US 2015/0057993 A1    Feb. 26, 2015

(51) Int. Cl.
*G06F 17/28* (2006.01)
*G06F 17/22* (2006.01)

(52) U.S. Cl.
CPC .......... *G06F 17/289* (2013.01); *G06F 17/2217* (2013.01); *G06F 17/2264* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
See application file for complete search history.

(56) References Cited

U.S. PATENT DOCUMENTS

| | | | | |
|---|---|---|---|---|
| 5,432,948 A * | 7/1995 | Davis | .................. | G06F 17/2217 704/2 |
| 5,499,335 A * | 3/1996 | Silver | .................... | G06F 9/4448 704/8 |
| 5,640,587 A * | 6/1997 | Davis | .................. | G06F 17/2217 382/229 |
| 7,899,475 B2 * | 3/2011 | Veeraraghavan | ....... | H04W 4/14 380/255 |
| 8,422,999 B1 * | 4/2013 | Harris | ............... | H04M 1/72522 382/229 |
| 9,116,940 B1 * | 8/2015 | Gupta | ............... | G06F 17/30336 |
| 2003/0195741 A1 * | 10/2003 | Mani | .................... | G06F 17/2863 704/8 |
| 2004/0158471 A1 * | 8/2004 | Davis | .................... | G06F 17/275 704/277 |
| 2006/0095249 A1 * | 5/2006 | Kong | .................... | G06F 9/4448 704/7 |
| 2010/0030849 A1 * | 2/2010 | Miyamoto | ................ | G06F 3/14 709/203 |
| 2011/0099000 A1 * | 4/2011 | Rai | ..................... | G06F 17/2863 704/2 |
| 2011/0218796 A1 * | 9/2011 | Suzuki | ..................... | G06F 17/28 704/2 |
| 2012/0259614 A1 * | 10/2012 | De Bruyn | ........... | G06F 17/2863 704/3 |
| 2013/0035926 A1 * | 2/2013 | Ushakov | ................. | G06F 17/28 704/2 |
| 2013/0151235 A1 * | 6/2013 | Och | ........................ | G06F 17/27 704/9 |
| 2013/0253901 A1 * | 9/2013 | Krack | ................... | G06F 17/289 704/2 |
| 2015/0057993 A1 * | 2/2015 | Phadke | ................. | G06F 17/289 704/3 |

* cited by examiner

*Primary Examiner* — Lamont Spooner
(74) *Attorney, Agent, or Firm* — Greenberg Taurig, LLP

(57) ABSTRACT

The disclosed embodiments illustrate methods and systems for translating a first language text entered into a computer application to a second language text. The method comprises intercepting the first language text during a display time by a processor. Subsequently, the first language text is translated to the second language text by the processor by performing a language dictionary look-up and/or a phonetic transliteration on the first language text. Thereafter, the second language text is displayed on a display device and the first language text is stored in ANSI format in a memory.

4 Claims, 4 Drawing Sheets

| Language L₁=English | Language L₂=Hindi |
|---|---|
| RAma (or RAm) | राम |
| RamA | रमा |
| Ramesh | रमेश |
| RAkesh | राकेश |
| RAJEEV (or RAJEEVJ) or RAJIV | राजीव |
| amit or ameet | अमित |
| AkAsh | आकाश |
| atul | अतुल |
| BHaT | भट |
| savitha | सविता |
| AsTHA (or AasTHA) | आस्था |
| supriya | सुप्रिय |
| supriyA | सुप्रिया |
| suneel | सुनिल |
| sunEEl | सुनील |

FIG. 3

Labels: 302, 304, 318, 306, 308, 310, 312, 314a, 314b, 316a, 316b; 300

METHOD AND SYSTEM FOR LANGUAGE TRANSLATION

TECHNICAL FIELD

The disclosure relates to language translation. More particularly, the disclosure relates to local language data entry support for application software.

BACKGROUND

When a user enters a character using a keyboard, the keystroke is received by the underlying operating system of the computer. An application software then receives this keystroke from the operating system and performs one or more operations. The key-stroke is interpreted as a binary code corresponding to a character encoding scheme used by the operating system and the application software.

A character encoding scheme is a mapping defined between a character set and its binary code representation. ANSI (American National Standard Institute) and Unicode standards are widely used character encoding schemes. The ANSI standard supports English and other European language characters. It also provides an extended support for up to 128 more characters of any other language. However, the Unicode standard supports more than 110,000 characters from 100 scripts. Clearly, languages having character sets larger than 128 base characters and variants cannot be accurately represented by using the ANSI standard. A character encoding scheme may be implemented in a variety of ways.

A code page is an implementation of a character encoding scheme for a particular language. There are interoperability issues in using ANSI-based code pages due to the possibility of their different implementations throughout the world. On the other hand, Unicode-based code pages are consistent throughout the world and support a large number of languages including those with large character sets. An enterprise software is one of the most commonly used application software today. Most of the enterprise software are still ANSI-based as they were envisioned to be used only in English and some European languages. To provide local language support, enterprise software needs to be migrated to Unicode, which is a time consuming and a costly process. For language translation consistency, production data is stored in all the supported languages. This greatly increases the storage requirement for a production database. Moreover, storing data in multiple languages leads to data consistency and usability issues. Thus, there is a need for providing local language support for application software by overcoming the above mentioned problems.

SUMMARY

According to embodiments illustrated herein there is provided a method for translating a first language text entered into a computer application to a second language text. The method comprises intercepting the first language text during a display time by a processor. Subsequently, the first language text is translated to the second language text by the processor by performing a language dictionary look-up and/or a phonetic transliteration on the first language text. Thereafter, the second language text is displayed on a display device and the first language text is stored in ANSI format in a memory.

According to embodiments illustrated herein there is provided a language translation system for translating a first language text entered into a computer application to a second language text. The language translation system comprises a memory that includes one or more program instruction modules, and a processor that is operable to execute the one or more program instruction modules. The one or more program instruction modules include an interceptor module, a translator module and a display interface module. The interceptor module intercepts the first language text during a display time. The translator module translates the first language text to the second language text by performing a language dictionary look-up and/or a phonetic transliteration on the first language text. The display interface module displays the second language text.

According to embodiments illustrated herein there is provided a computer program product for use with a computing device. The computer program product includes a non-transitory computer-readable medium having a computer readable program code embodied therein for language translation. The computer readable program code is executable by one or more processors in at least one computing device for intercepting a first language text entered into a computer application during a display time. The first language text is translated to a second language text by performing a language dictionary look-up and/or a phonetic transliteration on the first language text. Thereafter, the second language text is displayed on a display device and the first language text is stored in ANSI format in a memory.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

The accompanying drawings illustrate various embodiments of systems, methods, and/or other aspects of the invention. Any person having ordinary skill in the art will appreciate that the illustrated element boundaries (such as boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIG. 3 is an exemplary table representing case-sensitive English data entry and their corresponding Hindi language translations, in accordance with an embodiment.

DETAILED DESCRIPTION

Figure 1:
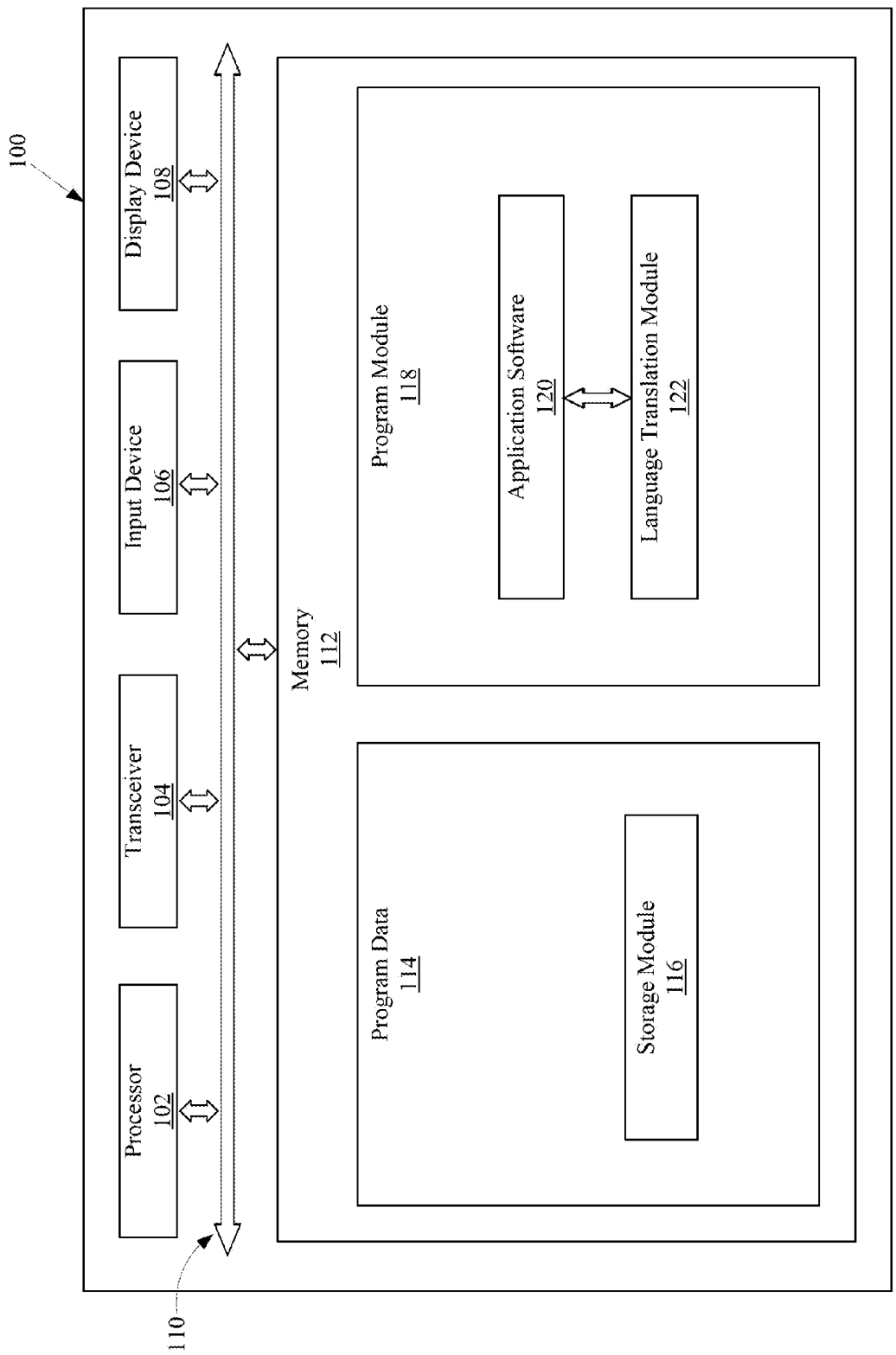
FIG. 1 is a block diagram illustrating a computer system in which the present disclosure may be implemented, in accordance with various embodiments.

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes as systems and methods may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

"ANSI-based computer application" refers to application software based on the American National Standard Institute (ANSI) character encoding scheme.

"Unicode-based computer application" refers to application software based on the Unicode character encoding scheme.

"Case-sensitive entry" refers to a text entry in which a combination of upper and lower case characters are used. A text entered in a case-sensitive manner would have different interpretations for upper case and lower case characters of the alphabets.

"Localization" of a computer application refers to enabling the computer application for operability in a local language. A computer application generally operable in a language $L_1$ is also operable in a language $L_2$ upon localization of the application for the language $L_2$.

"Phonetic Transliteration" is a process of translating a text in language $L_1$ to a text in language $L_2$ by way of phonetically replacing the characters within the language $L_1$ text to phonetically equivalent characters in language $L_2$. Phonetic transliteration is generally done for proper nouns which need to be translated in such a way that they sound phonetically similar in the target language.

"Phonetic Mismatch" is a phenomenon in which a character in a language $L_1$ may have more than one phonetic equivalent in a language $L_2$. Thus the same spelling in the language $L_1$ for a proper noun may yield more than one result in the language $L_2$ causing inconsistencies.

"Case normalization" refers to the conversion of the case of characters in a text to an acceptable case. A user may enter text in an improper case, but before storage or display, this case should be normalized to an appropriate case (either upper case or lower case).

"Display time of a text" refers to a period after the text is input by user into a computer application but before this input text is displayed. It also refers to a period after the text is retrieved from a storage by the computer application but before this retrieved text is displayed.

The terms "computer application" and "application software" are synonymous and have been used interchangeably in the disclosure.

FIG. 1 is a block diagram illustrating a computer system 100 in which the present disclosure may be implemented, in accordance with various embodiments. The computer system 100 includes a processor 102, a transceiver 104, an input device 106, a display device 108, a memory 112, and a system bus 110 that communicatively connects the components 102, 104, 106, 108 and 112. The memory 112 further comprises a program data 114 and a program module 118. The program data 114 further comprises a storage module 116, while the program module 118 further comprises application software 120 and a language translation module 122. In an embodiment, the computer system 100 may be, but is not limited to, a desktop computer, a laptop, a tablet computer, a personal digital assistant (PDA), a smart-phone or any other general purpose computing device.

In an embodiment, the processor 102 may be, but is not limited to, a general-purpose processor, a programmed microprocessor, or a micro-controller. The processor 102 is operable to, but is not limited to, manage the computer system 100, schedule and process the execution of instructions from the program module 118, manage saving and retrieving of data to and from the program data 114, co-ordinate working of the other components of the computer system 100 (namely the transceiver 104, the input device 106, the display device 108 and the memory 112) by receiving requests from the respective components and issuing relevant commands through the system bus 110. The architecture of the processor 102 may be, but is not limited to, Minimal Instruction Set Computing (MISC) architecture, Reduced Instruction Set Computing (RISC) architecture, or Complex Instruction Set Computing (CISC) architecture.

The transceiver 104 is operable to, but is not limited to, provide a communication interface between the computer system 100 and a communication network. The communication network may include, but is not limited to, a Personal Area Network (PAN), a Local Area Network (LAN), a Metropolitan Area Network (MAN), a Wide Area Network (WAN), or the Internet. An implementation of the network in an embodiment may comprise a wireless network, a wired network or a combination thereof. In an embodiment, the transceiver 104 may be, but is not limited to a Wireless Internet Adaptor, a Wi-Fi Adaptor, an Ethernet card, a modem, a combination of thereof or any other network interface device.

The input device 106 is operable to, but is not limited to, provide an interface between a user and the computer system 100 so as to enable the computer system 100 to receive user input. In an embodiment, the input device 106 may be, but is not limited to, a keyboard, a mouse, a tactile keypad, a joystick, a scroll-wheel, a voice-activated input interface, or a gesture-based input interface, any combination thereof, or any other input medium.

The display device 108 is operable to, but is not limited to, display a visual output to the user of the computer system 100. In an embodiment, the display device 108 may be an inbuilt display screen of the computer system 100. In an alternate embodiment, the display device 108 may be an external screen that is not a part of the computer system 100 but is communicatively coupled to the computer system 100. Accordingly, the communicative coupling between the display device 108 and the computer system may not necessarily be the system bus 110 and but may be a connecting cable or any other communicative coupling.

The system bus 110 is operable to, but is not limited to, communicatively couple various components of the computer system 100, namely the processor 102, the transceiver 104, the input device 106, the display device 108 and the memory 112. In an embodiment, the system bus 110 may carry three types of signals between the computer system components. These signals are—data signals carrying information, address signals carrying target address of a destined component and control signals carrying commands or instructions of one or more operations to be performed by or on the destined component. The system bus 110 may be implemented using any technique known in the art.

The memory 112 is operable to, but is not limited to store program instructions (as various program instruction modules), program data, user data, system and user logs, and other data that may be required to operate and manage the computer system 100. In an embodiment, the memory 112 may be a Random Access Memory (RAM), a Read Only Memory (ROM) or any other type of volatile or non-volatile memory. Further, the memory 112 may be implemented as a hard-disk drive or a removable storage drive, such as a floppy-disk drive, optical-disk drive, flash drive or other computer-readable memory devices.

The memory 112 comprises two components, namely the program data 114 and the program module 118. In an embodiment, the program data 114 and the program module 118 may be within the same physical memory but in disparate logical memory portions. In another embodiment, the program data 114 and the program module 118 may be within disparate physical memory drives. In yet another embodiment, the program data 114 and the program module 118 may be within the same physical memory and within the same logical memory portion.

In an embodiment, the program data 114 comprises, but is not limited to, system files, user files, system logs, user logs and other program data required by the program module 118. The system files may include files required to operate and manage the computer system 100. The user files may include files storing configuration information inputted by users of the computer system 100. The system logs may include history about the computer system operation and statistics over a period of time. The user logs may include usage history of the computer system segregated by users, application software used, operations performed and so on. In an embodiment, the program data 114 further comprises the storage module 116.

In an embodiment, the storage module 116 is operable to store data for one or more application software 120 installed on the computer system. In another embodiment, the storage module 116 may also be operable to store system and user logs as described in the context of the program data 114 above. In an embodiment, the storage module 116 can be a typical relational database system, a hierarchical database system, a file-based database system, an object-relational database system, a hybrid database system or any other type of database or storage system commonly known in the art.

The program module 118 comprises a set of computer instructions (in the form of the program instruction modules) which when executed by the processor 102 performs a user function on the computer system 100. The program module 118 may be implemented in any of the software programming languages known in the art such as, but not limited to, 'C', 'C++', 'Visual C++', 'Visual Basic', 'VB.Net', 'C#.Net', 'ASP.Net' or 'Java'. Further, the program module 118 may be in the form of a collection of separate programs, a program module containing a larger program or a portion of a program module. The program module 118 may also include modular programming in the form of object-oriented programming. The program module 118 of the disclosure can also be implemented in various operating systems and platforms including, but not limited to, 'Unix', 'DOS', 'Windows', 'Mac OS', 'iOS', 'Android', 'Symbian', and 'Linux'.

The program module 118 further comprises one or more applications software 120 and the language translation module 122. For the sake of brevity, the disclosure is described with respect to one application software designated as 120. However, those skilled in the art would appreciate that the disclosure may be implemented with respect to more than one application software in a similar manner. The application software 120 may be, but is not limited to, an enterprise software, an accounting software, a banking software, an office productivity suite, an entertainment software, an education software, or any other application software. In an embodiment, the application software 120 may be an ANSI-based computer application. In an alternate embodiment, the application software 120 may be a Unicode-based computer application.

The language translation module 122 is operable to, but is not limited to, provide local language data entry support to the application software 120 for a language $L_2$, while the application software 120 is configured to support language $L_1$ by default. For the sake of brevity, the disclosure is described with respect to only two languages $L_1$ and $L_2$. However, those skilled in the art would appreciate that the disclosure may be implemented with respect to multiple languages in a similar manner. Thus, the language translation module 122 may provide local language data entry support for multiple languages $L_2, L_3, L_4 \ldots L_n$ to the application software 120. In an embodiment, the language translation module 122 may be implemented as a plug-in or an add-in of the application software 120. In another embodiment, the language translation module 122 may be implemented as a standalone software module that extends the functionality of the application software 120 without the need for any change to the code of the application software 120. The language translation module 122 is described in detail with respect to FIG. 2 below.

In an embodiment, the disclosure may be implemented using a client-server architecture. In such a scenario, the computer system 100 may be realized as a server computer, a client computer, or both. Further, the server and the client computers may be connected via any communication network. In an embodiment, the language translation module 122 may be implemented on the server computer and the application software 120 may be implemented on the client computer. In an alternative embodiment, the language translation module 122 may be implemented on the client computer and the application software 120 may be implemented on the server computer.

In an embodiment, the disclosure may be implemented using a cloud-based architecture. In such a scenario, either the application software 120 or the language translation module 122 may be implemented as a cloud application. Alternatively, both the application software 120 and the language translation module 122 may be implemented as cloud applications.

In an embodiment of the disclosure, the input device 106 may be configurable for data entry in multiple languages. The input device 106 may be designed for data entry primarily in a language $L_1$, however it may also provide an option for data entry in other languages $L_2, L_3, L_4 \ldots L_n$ and so on. When operable in language $L_1$, characters of language $L_1$ may be shown as labels on a text entry key-pad of the input device 106 to facilitate text entry. When operable in another language $L_2$, the labels of the text entry key-pad may be those corresponding to characters of language $L_2$. Thus, a user not knowing language $L_1$ would be able to perform text entry in his native language $L_2$. The characters displayed as labels on the text entry key-pad of the input device 106 may be automatically changed to those of a user selected language. Alternatively, the labels may be manually changed by placing stick notes on the text entry key-pad of the input device 106, while using a conventional low cost input device like a standard "Qwerty type English keyboard".

Figure 2:
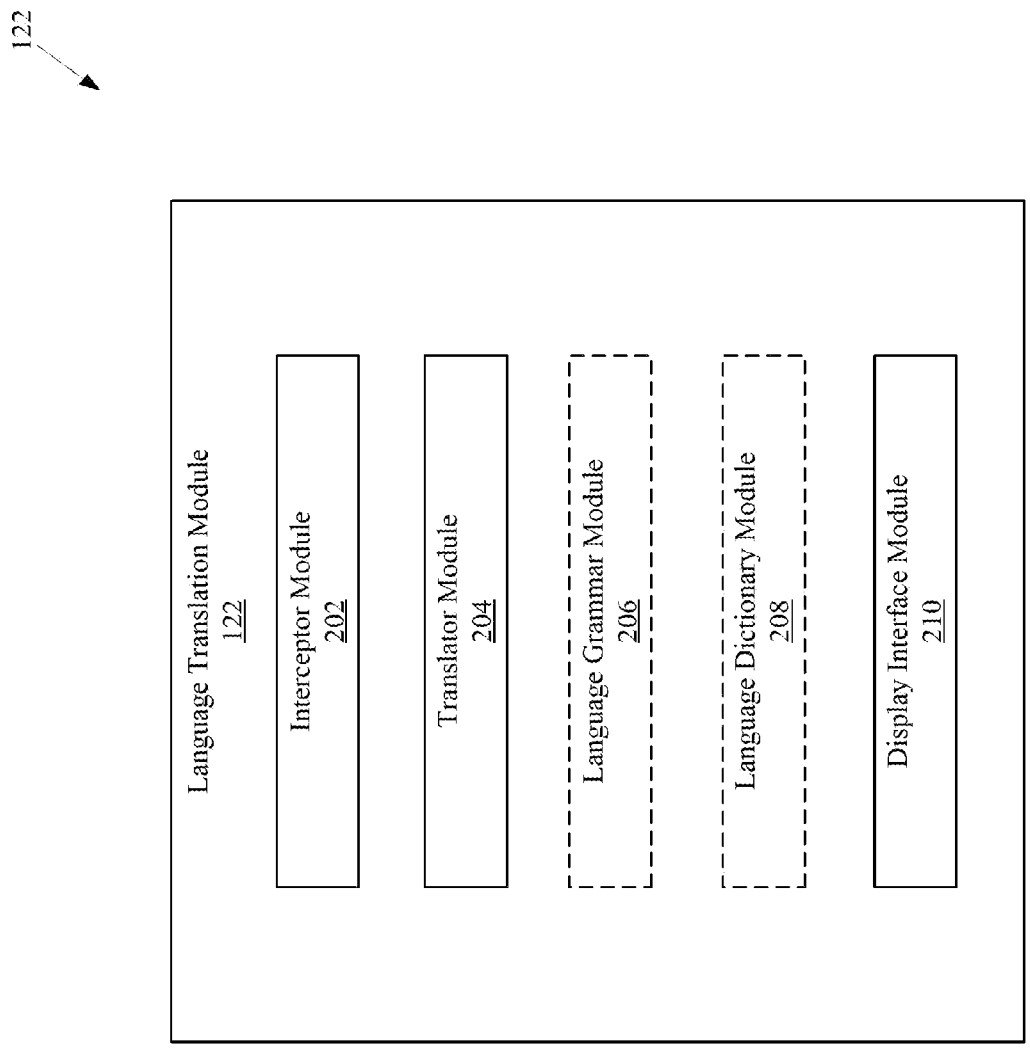
FIG. 2 is a block diagram illustrating a language translation module, in accordance with at least one embodiment of the disclosure.

FIG. 2 is a block diagram illustrating the language translation module 122, in accordance with at least one embodiment of the disclosure. In an embodiment, the language translation module 122 comprises three components, namely an interceptor module 202, a translator module 204 and a display interface module 210. In another embodiment, the language translation module 122 may also comprise a language grammar module 206 and a language dictionary module 208. The language grammar module 206 and the language dictionary module 208 may be implemented as standalone modules or alternatively may be implemented as a part of the translator module 204.

The working of the language translation module 122 is now described in brief. The application software 120 receives a language $L_1$ text, $T_{L1}$ entered by a user. This text (hereinafter referred to as $T_{L1}$) may be entered through a case-sensitive text entry made in upper and lower case letters. The interceptor module 202 intercepts this text during its display time. Subsequently, the translator module 204 translates the text ($T_{L1}$) to a language $L_2$ text ($T_{L2}$). Then, the display interface module 210 displays the translated language $L_2$ text ($T_{L2}$). The original language $L_1$ text ($T_{L1}$) is stored in the storage module 116 in ANSI format. An elaborated description of the individual components of the language translation module 122 is now presented below.

The interceptor module 202 is operable to intercept the text $T_{L1}$ from the application software 120. As already described, the text $T_{L1}$ is entered into the application software 120 and subsequently displayed. The interceptor module 202 intercepts this text ($T_{L1}$) during its display time. Thus, the interceptor module 202 intercepts the text being sent for display by the application software 120 by acting as a display abstraction layer between the application software 120 and the operating system of the computer system 100. In an embodiment, text entered into the application software 120 is directly stored in the storage module 116 by the application software 120. In another embodiment, the interceptor module 202 may also be operable to initiate storage of the text $T_{L1}$ in ANSI format in the storage module 116. The interceptor module 202 may initiate storage by either sending a storage request to the application software 120 or by sending a storage request to the storage module 116. In an embodiment, a case normalized version of the text $T_{L1}$ may be stored in the storage module 116 in ANSI format. In an embodiment, the interceptor module 202 may intercept a pre-stored language $L_1$ text (hereinafter referred to as $T'_{L1}$) in ANSI format on retrieval by the application software 120 from the storage module 116. In an embodiment, the text $T_{L1}$ may be a case normalized version of the pre-stored language $L_1$ text. This text $T'_{L1}$ may be processed in the same manner as the text $T_{L1}$ by the language translation module 122. Thus, those skilled in the art would appreciate that any reference to the text $T_{L1}$ may be substituted by the text $T'_{L1}$ in the disclosure with a similar interpretation.

The translator module 204 is operable to translate the intercepted text $T_{L1}$ to a language $L_2$ text. In an embodiment, the translation takes place by performing a language dictionary look-up on the text $T_{L1}$. If the language dictionary look-up does not yield any relevant result, then the text $T_{L1}$ is subjected to a phonetic transliteration.

The language grammar module 206 is operable to maintain a grammar rule set for languages $L_1$ and $L_2$. The grammar rules may comprise phonetic transliteration rules that specify how the character set of the language $L_1$ and $L_2$ are phonetically equivalent. In an embodiment, the phonetic transliteration rules may interpret a language $L_1$ text to a transliterated language $L_2$ text in a case sensitive manner. Thus, there may be a different translation for a character in upper case and the same character in lower case. In an embodiment, the language grammar module 206 is used by the translator module 204 for phonetic transliteration. In an embodiment, the language grammar module 206 contains pre-configured non-modifiable grammar rule set. In an alternate embodiment, the grammar rule set of the language grammar module 206 is configurable by an administrative user who may edit the grammar rule set according to a preferred dialect of the language $L_1$ and/or $L_2$. The process of phonetic transliteration is explained in detail with reference to FIG. 3.

FIG. 3 is an exemplary table 300 representing case-sensitive English data entries and their corresponding Hindi language translations, in accordance with an embodiment. Hindi language based on the Devanagari script is highly phonetic and contains 10 vowels and 40 consonants. The representation of a Hindi character in a word depends upon the adjoining characters, which may be one or more preceding and/or succeeding characters in the word. There are multiple inherent phonetic mismatches between English and Hindi characters. There is an implicit vowel in Hindi words which is not the case for English. Thus, a name "Rama" in English may have more than one transliteration as shown in 302 and 304. There are certain consonants in English, which have more than one transliteration in Hindi. The Hindi transliterations of the English consonant "t" as in "Amit" and "Bhat" are different as shown in 306 and 308. A similar example is that of "Savitha" and "Astha" as shown in 310 and 312. Another anomaly is that a name with a particular English spelling may have more than one possible spelling in Hindi as is illustrated by examples such as "Supriya" and "Suneel" shown in 314a, 314b and 316a, 316b respectively. Conversely, a name in Hindi may have more than one possible English spelling based on personal preferences. A classic example is a name "Rajeev" which may also be spelled as "Rajiv" in English, though both would have the same Hindi spelling as shown in 318. "Amit" and "Ameet" is another such example of a name with multiple possible English spellings and a single Hindi spelling as shown in 306. The phonetic transliteration of the disclosure is sensitive to the case of the source text (language $L_1$ text—$T_{L1}$). The above anomalies are taken care of by entering the source text in an appropriate case. A proper upper and lower case combination can yield a desired local language text (language $L_2$ text) while maintaining the original spelling in language $L_1$, as is evident from FIG. 3. The first column of the table 300 illustrates case-sensitive text in English, while the second column shows the resulting translation in Hindi with a desired spelling. The examples shown in the table 300 are for illustrative purposes and are not inclusive. Other combinations may also be possible. Also, the languages $L_1$ and $L_2$ may not necessarily be English and Hindi.

Referring again to FIG. 2, the language dictionary module 208 is operable to maintain a look-up table that contains a mapping between words and phrases of language $L_1$ and their corresponding counterparts in language $L_2$. The mapping may be one-to-one, many-to-one, one-to-many or many-to-many. In an embodiment, the language dictionary module 208 is used by the translator module 204 to perform dictionary look-up of text in language $L_1$ to obtain a translated text in language $L_2$. In an embodiment, the look-up table is non-modifiable and contains a fixed vocabulary set for both the languages $L_1$ and $L_2$. In an alternate embodiment, the look-up table of the language dictionary module 208 is configurable by an administrative user who may add to the vocabulary set of both the languages $L_1$ and $L_2$. The administrative user may also add, delete or change one or more mappings between the words and phrases of languages $L_1$ and $L_2$. In an embodiment, when there are multiple translations possible between a language $L_1$ text and a language $L_2$ text, a user may be presented with an option to choose the best translation.

The display interface module 210 is operable to display the language $L_2$ text ($T_{L2}$) on the display device 108. This language $L_2$ text ($T_{L2}$) is a translation of the language $L_1$ text ($T_{L1}$) to language $L_2$ as translated by the translator module 204. Like the interceptor module 202, the display interface module 210 also acts as a display abstraction layer between the application software 120 and the operating system of the computer system 100. The interceptor module 202 intercepts text ($T_{L1}$) being sent for display by the application software 120, while the display interface module 210 sends a translated version of this text ($T_{L2}$) for display. Thus, a user enters text in language $L_1$ ($T_{L1}$), but he/she is displayed a translated text in language $L_2$ ($T_{L2}$). The display interface module 210 may also display the original language $L_1$ text or its case normalized version as a user feedback in language $L_1$.

While the display interface module 210 displays the translated language $L_2$ text ($T_{L2}$) to the user, the language $L_1$ text ($T_{L1}$) is still stored in the storage module 116 in ANSI format. Thus, data entry is in language $L_1$, data display is in language $L_2$, while data storage is in language $L_1$. Stored data is again displayed in language $L_2$ on retrieval.

Storing the text in one language (language $L_1$) keeps the database consistent. Preferably, data is always stored in the same language ($L_1$) irrespective of the language in which the data is entered by the user. Most enterprise software providing local language data entry support store the production data in multiple languages so as to have consistency in language translations. The language translation module 122 of the disclosure eliminates the need for maintaining duplicate data in multiple languages, which leads to a significant cost saving. The language translation module 122 intercepts the text $T_{L1}$ during its display and translates the text $T_{L1}$ in language $L_1$ to the text $T_{L2}$ in language $L_2$. Subsequently, the text $T_{L1}$ is stored in the storage module 116 in ANSI format, while the text $T_{L2}$ is displayed on the display device 108. Another advantage is that the data is stored in ANSI format. Most of the databases used with application software today are ANSI-based and hence are already capable of storing data in ANSI format. This eliminates the need for migration of the existing databases to Unicode thereby reducing the cost further. Moreover, a user feels that data entry is done in his/her local language as the text entered by him/her is displayed in the local language. However, the data that is actually stored in the database may still be in a global language such as English. As the data entry and the data display are in the local language, while the data storage is in the global language, a pseudo-local language data entry is achieved.

Figure 4:
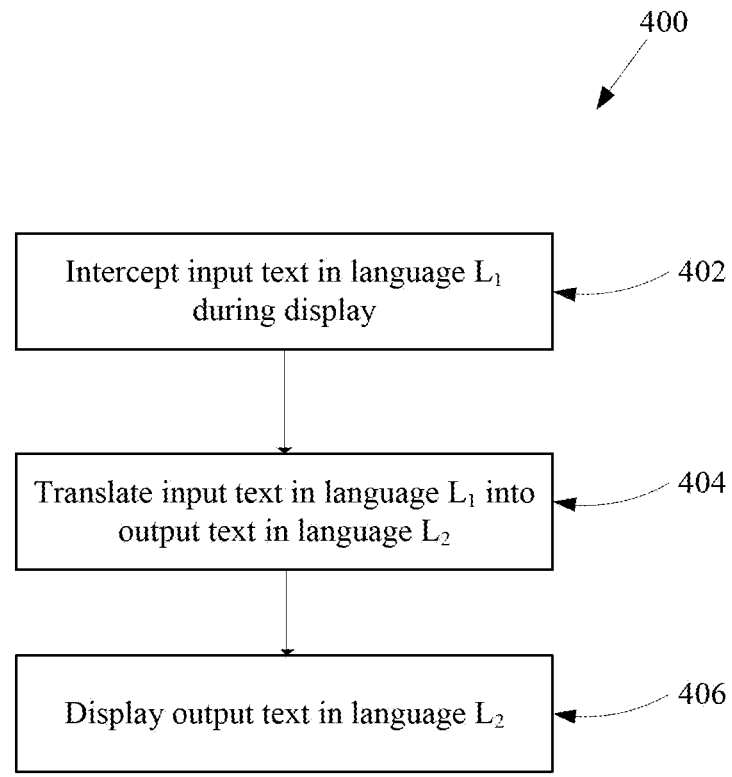
FIG. 4 is a flow chart illustrating a method of language translation, in accordance with at least one embodiment of the disclosure.

FIG. 4 is a flow chart 400 illustrating a method of language translation, in accordance with at least one embodiment of the disclosure. The method starts at step 402 when a language $L_1$ text ($T_{L1}$) is intercepted during its display. Here, the language $L_1$ text ($T_{L1}$) is entered by a user into the application software 120. This text may be entered through a case sensitive text-entry. The interceptor module 202 intercepts this text ($T_{L1}$) from the application software 120 during its display time. At step 404, the language $L_1$ text ($T_{L1}$) is translated to a language $L_2$ text ($T_{L2}$). The translator module 204 carries out this language translation by performing a language dictionary look-up and/or a phonetic transliteration on the language $L_1$ text ($T_{L1}$). The language grammar module 206 and/or the language dictionary module 208 may also be involved in the language translation process. The language translation process has already been explained in detail with reference to FIG. 2 and FIG. 3. Thereafter, at step 406, the language $L_2$ text ($T_{L2}$) is displayed by the display interface module 210. The language $L_1$ text ($T_{L1}$) is stored in ANSI format in the storage module 116. In an embodiment, a case normalized version of the language $L_1$ text ($T_{L1}$) may be stored in ANSI format in the storage module 116. In an embodiment, the interceptor module 202 may intercept a pre-stored language $L_1$ text ($T'_{L1}$) on its retrieval by the application software 120 from the storage module 116.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, and a display unit. The computer further comprises a microprocessor. The microprocessor is connected to a communication bus. The computer also includes a memory. The memory may be a Random Access Memory (RAM) or a Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other databases. The communication unit may include a modem, an Ethernet card, or other similar devices which enable the computer system to connect to databases and networks, such as LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', 'Visual Basic', 'V/B.Net', 'C#.Net', 'ASP.Net' and 'Java'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix', 'DOS', 'Windows', 'Mac OS', 'iOS', 'Android', 'Symbian', and 'Linux'.

The programmable instructions can be stored and transmitted on a non-transitory computer-readable medium. The disclosure can also be embodied in a computer program product comprising a non-transitory computer-readable medium, or with any product capable of implementing the above methods and systems, or the numerous possible variations thereof.

The system, method and computer program product, as described above, have numerous advantages. An advantage of the disclosure is that backend database used by the application software 120 can still be in ANSI format, as the disclosure enables storage of the language $L_1$ text in ANSI format in the database. Most of the currently used databases are ANSI-based. Hence, the existing databases need not be migrated to Unicode. This leads to a significant cost saving. Most enterprise software with local language data entry support store the production data in multiple languages for consistency in language translations. However, in the currently disclosed embodiments the data does not need to be stored in multiple languages. The disclosure enables intercepting the language $L_1$ text during its display and the translation of the language $L_1$ text to language $L_2$ text. Subsequently, the language $L_2$ text is displayed on the display device 108, while the language $L_1$ text is stored in the database in ANSI format. Thus, the data may be stored in English, which eliminates the cost needed for increasing storage capacity of data servers. This also maintains data consistency as all the data is stored in one language (English). As the stored data is not in mixed languages, reports generated from this data are also homogenous. Thus, the need for data cleansing at the time of report generation is also eliminated. Yet another advantage of the disclosed embodiments is that despite phonetic mismatches between the source and the target languages, a desired translation in the target language can be obtained without modifying the spellings of the text in the source language. By varying the case of letters in the source language text, a user may obtain the desired target language text. Yet another advantage is that local language support for application software 120 can be implemented without any modification to the underlying application software code.

The present disclosure can be useful in a variety of scenarios. For example, a rural bank in a village may use the language translation module 122 of the disclosure to provide local language data entry for its banking applications. As described earlier with reference to FIG. 2, a novice user may perform data entry in his/her local language. Thus, a customer knowing only his local language, say Hindi, may enter and check his/her details while opening a bank account or performing other operations with his/her bank account using Hindi language. If the entered data in stored in a local language, then it may not be understood by bank operators in other parts of the country which have a different local language. The language translation module 122 of the disclosure stores the data in one language which may be an official language known and used throughout the country, for example English. While operating the bank account in another part of the country, the operator would be displayed the data in a local language of that place and optionally also in the official language. He/she may perform data entry in his/her local language, but the data updated on the database would still be in the official language. Thus, the customer data would remain consistent. There may be a requirement of issuing bank drafts or bonds to a customer in a local language. There is a possibility that the draft or the bond is redeemable at another location within the country which has a different local language. There is a difficulty in processing such drafts or bonds at the other location. However, using the language translation module 122 of the disclosure and assuming that the necessary entries for the draft or the bond have been made in the database, the draft or the bond may be verified and processed easily.

Various embodiments of the method and system for localization of application software and language translation are described. However, it should be apparent to those skilled in the art that modifications in addition to those described are possible without departing from the inventive concepts herein. The embodiments, therefore, are not restrictive. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above disclosed system elements or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art which are also intended to be encompassed by the following claims.

What is claimed is:

1. A method for translating a first language text entered into a computer application to a second language text, the method comprising:
    intercepting, by a processor, the first language text during a display time;
    translating, by the processor, the first language text to the second language text by performing a language dictionary look-up and a phonetic transliteration on the first language text,
    wherein the phonetic transliteration is based on combination of upper and lower case characters entered in the first language, for translating phonetically mismatched and phonetically equivalent words in the second language;
    wherein the first language text is stored in a case normalized ANSI format in a memory; and
    displaying, on a display device, the second language text.

2. A language translation system for translating a first language text entered into a computer application to a second language text, the system comprising:

a memory comprising one or more program instruction modules, wherein the one or more program instruction modules comprise an interceptor module configured for intercepting the first language text during a display time, wherein the interceptor module is further configured for initiating storage of the first language text in a case normalized ANSI format in the memory;

a translator module configured for translating the first language text to the second language text by performing a language dictionary look-up;

a language grammar module configured for maintaining a grammar rule set which further comprises phonetic transliteration rules for translating the first language text to obtain the second language text, wherein the phonetic transliteration rules are based on combination of upper and lower case characters entered through first language, for translating phonetically mismatched words and phonetically equivalent words in the second language;

a display interface module configured for displaying the second language text on a display device; and a processor operable to execute the one or more program instruction modules.

3. The language translation system of claim 2, wherein the one or more program instruction modules further comprise a language dictionary module configured for maintaining a look-up table, the look-up table comprising a first set of words and phrases in the first language and a second set of words and phrases in the second language, and wherein the second set of words and phrases correspond to translation of the first set of words and phrases from the first language to the second language.

4. A computer program product for use with a computing device, the computer program product comprising a non-transitory computer-readable medium having a computer readable program code embodied therein for language translation, wherein the computer readable program code is executable by one or more processors in at least one computing device for:

intercepting a first language text during a display time, wherein the first language text was entered into a computer application;

translating the first language text to a second language text by performing a language dictionary look-up and a phonetic transliteration on the first language text, wherein the phonetic transliteration is based on combination of upper and lower case characters entered through first language, for translating phonetically mismatched words in the second language; wherein the first language text is stored in a case normalized ANSI format in a memory; and displaying the second language text on a display device.

* * * * *